(12) United States Patent
Eldridge

(10) Patent No.: US 10,065,443 B2
(45) Date of Patent: Sep. 4, 2018

(54) PAGING DEVICE

(71) Applicant: Gwendolyn Elaine Simmons Eldridge, Buffalo, NY (US)

(72) Inventor: Gwendolyn Elaine Simmons Eldridge, Buffalo, NY (US)

( * ) Notice: Subject to any disclaimer, the term of this patent is extended or adjusted under 35 U.S.C. 154(b) by 119 days.

(21) Appl. No.: 15/092,805

(22) Filed: Apr. 7, 2016

(65) Prior Publication Data
US 2016/0318332 A1 Nov. 3, 2016

Related U.S. Application Data

(60) Provisional application No. 62/156,395, filed on May 4, 2015.

(51) Int. Cl.
| | |
|---|---|
| *B42D 9/04* | (2006.01) |
| *B43K 29/00* | (2006.01) |
| *B25J 1/04* | (2006.01) |
| *G02B 25/00* | (2006.01) |

(52) U.S. Cl.
CPC .................... *B42D 9/04* (2013.01); *B25J 1/04* (2013.01); *B43K 29/00* (2013.01); *G02B 25/002* (2013.01)

(58) Field of Classification Search
CPC .... B42D 9/04; B43K 31/00; B25J 1/00; B25J 1/02
See application file for complete search history.

(56) References Cited

U.S. PATENT DOCUMENTS

| | | | | |
|---|---|---|---|---|
| 5,735,544 A | * | 4/1998 | Buckner | B42D 9/04 281/45 |
| 8,006,390 B2 | | 8/2011 | Mueller et al. | |
| 2005/0079003 A1 | * | 4/2005 | Buck | B43K 29/00 401/195 |
| 2005/0220530 A1 | * | 10/2005 | Carmona | A46B 7/04 401/195 |
| 2009/0139051 A1 | * | 6/2009 | Hobbs | B05C 17/0205 16/110.1 |
| 2015/0093175 A1 | * | 4/2015 | Perkins | B43K 8/003 401/202 |
| 2016/0296003 A1 | * | 10/2016 | Beckerman | A46B 5/002 |

FOREIGN PATENT DOCUMENTS

| | | | | |
|---|---|---|---|---|
| CN | 202173008 U | * | 3/2012 | |
| JP | 2014113815 A | * | 6/2014 | |
| WO | WO 9831605 A1 | * | 7/1998 | A46B 17/04 |

OTHER PUBLICATIONS

Ableware 732161000 Hand/Wrist Cuff Page Turner/Keyboard Aid; website https://www.amazon.com/Ableware-732161000-Wrist-Turner-Keyboard/dp/B0002DL8BU/ref=cm_cr_arp_d_product_top?ie=UTF8; accessed Jan. 8, 2018; dated May 28, 2013/.*

* cited by examiner

*Primary Examiner* — Daniel J Colilla
(74) *Attorney, Agent, or Firm* — Ernesto Garcia

(57) ABSTRACT

A paging device allows a user to flip a stack of papers very swiftly. The paging device integrates a rubberized tip and an ergonomic handle with gel rests in stress points. The paging device further includes a set of accessories such as a detachable highlighter and a detachable magnifier. The highlighter is in the form of a wheel. Either of the highlighter and magnifier is housed with a cap.

18 Claims, 3 Drawing Sheets

PAGING DEVICE

BACKGROUND OF THE INVENTION

In the documentation industry, a person normally a finder needs to find a paper in a stack of papers. To do so, the finder would use a rubber sleeve, or otherwise known as a fingertip, fitted to the index finger. As such, the use of the rubber sleeve allows the user to flip through pages and pages in a stack of papers to find a particular paper. This approach works for a short period until the finger gets soggy and wet due to the rubber. Furthermore, the rubber sleeve puts compression stress on the finger and can cause pain during prolong use of the rubber sleeve. The rubber sleeve has been know to be tubular and sometime contains a surface pattern such as ribs, projections, or ridges, which assist in gripping the paper. In other known designs the sleeve is made of rubber or a gel rubber and have holes to act as ventilation. While the rubber sleeve is a solution to flipping paper, the instant invention improves the experience of flipping a stack of papers.

SUMMARY OF THE INVENTION

The invention is geared towards a paging device that allows a user to flip to stack of papers by holding an ergonomic handle. The shape of the handle includes three sections, where one of the sections is curved and includes a detachable cap at one end. The paging device includes a kit two interchangeable accessories that can be inserted at the end of the handle. The first accessory is a highlighter accessory and the second accessory is a magnifying accessory. The accessory provides the user greater flexibility in trying to magnify text in a paper found or simple highlight text in the paper found.

The paging device includes a leading portion in the shape of a human finger. The leading portion includes a rubber layer that can be attached or overmolded to a core of the handle. The leading portion then blends into a transition portion where the user will place the index finger against a gel on the transition portion. The paging device further includes additional gels for grasping the paging device for long periods. In the curved portion of the handle, an elongated gel rests on the surface to allow the user to rest the palm of the hand.

The paging device includes an ink reservoir to be in fluid flow when the highlighter accessory is in place. When not in used the ink reservoir will be blocked off by the magnifying accessory. It envisioned that the handle can be made from any know material, in particular plastic or metal.

It is envisioned that the shape of the handle is ergonomic to allow for long periods of flipping stacks of paper or flip through a Bible to get to a passage. It is also envisioned that the instant invention is as good for counting and sorting.

DETAILED DESCRIPTION OF THE INVENTION

Figure 1:
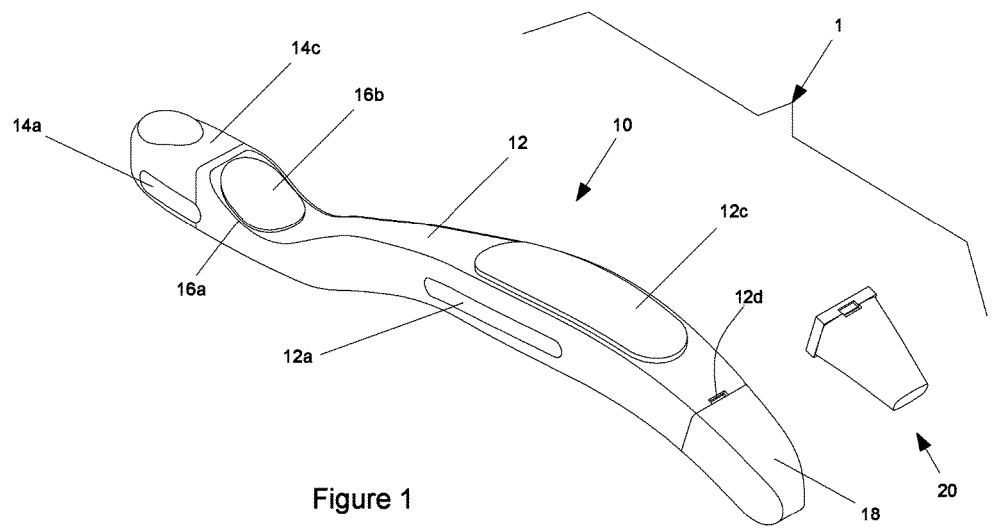
FIG. 1 is an isometric view of the paging device with an optical accessory.
Figure 2:
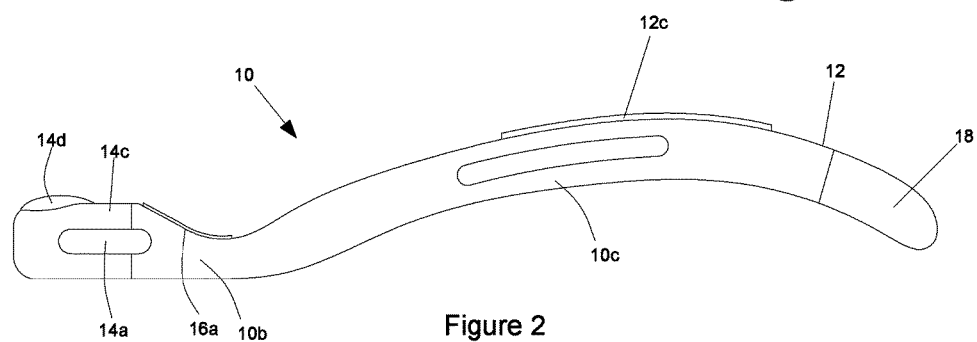
FIG. 2 is a front view of only the paging device of FIG. 1.
Figure 3:
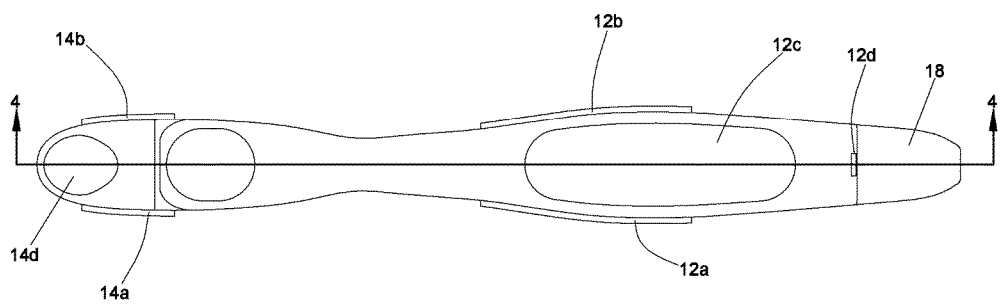
FIG. 3 is a top view of only the paging device of FIG. 1.
Figure 4:
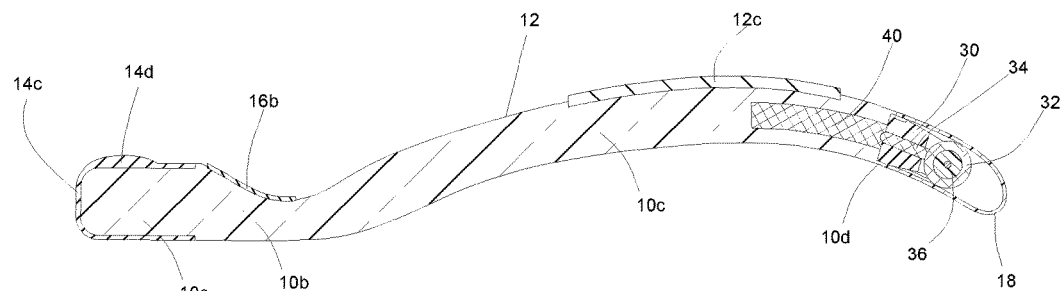
FIG. 4 is cross-sectional view 4-4 shown in FIG. 3.
Figure 5:
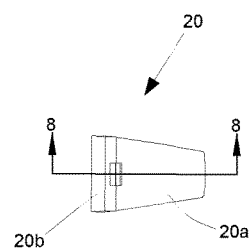
FIG. 5 shows a top view of the optical accessory shown in FIG. 1.
Figure 6:
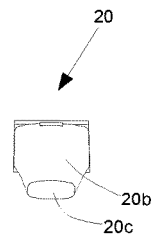
FIG. 6 shows a right side view of the optical accessory shown in FIG. 5.
Figure 7:
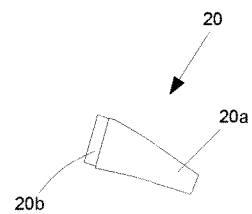
FIG. 7 shows front view of the optical accessory shown in FIG. 5.
Figure 8:
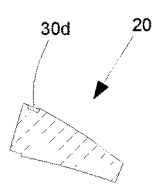
FIG. 8 shows cross-sectional view 8-8 shown in FIG. 5.
Figure 9:
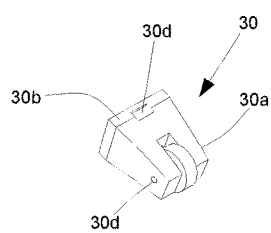
FIG. 9 shows an isometric view of the highlighter accessory shown in FIG. 4.
Figure 10:
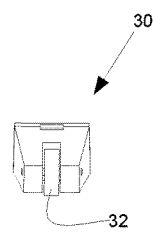
FIG. 10 shows a right side view of the highlighter accessory shown in FIG. 9.

FIG. 1 shows an isometric view of the paging device 10 and an optical accessory 20 as a kit 1. The paging device 10 comprises a handle 12 made from a plastic material. The handle 12 comprises a leading portion 10a, a transition portion 10b, and a curved portion 10c as shown in FIG. 4. The leading portion 10a holds a rubber layer 14c. The rubber layer 14c is either fitted over the leading portion 10a or overmolded to the leading portion 10a. The rubber layer 14c includes an oval bump 14d to simulate the leading portion 10a to look like a human finger. A pair of opposite gels 14a, 14b project from the sides of the leading portion 10a to assist the user grab the leading portion with two fingers for prolong periods. The transition portion 10b is adjacent to the leading portion 10a and contains a tapered surface 16a as seen in FIG. 2. The tapered surface 16a narrows towards the back of the handle 12. An index gel 16b projects from tapered surface 16a to assist the user grab the handle 12 with the index finger. The curved portion 10c blends with the transition portion 10b. The curved profile of the curved portion 10c is arched upwardly relative to the bottom of the tapered surface 16a. The curved portion 10c also includes a pair of side gels 12a, 12b and an elongated gel 12c. The elongated gel 12c will allow the palm of a user to rest comfortably.

FIGS. 1-4 show an end cap 18 housing a highlighter accessory 30 inside. The handle 12 features a notch 12d at the end of the curved portion 10c. This allows the cap 18 to be removed to remove both the cap 18 and the accessory optionally thereafter. The handle 12 houses an ink reservoir 40 that is in fluid contact with a cylindrical felt guide 30. The ink reservoir 40 is similar to those as found in an ordinary highlighter. The ink reservoir 40 in this instant application contours to the shape of the curved portion 10c. The ink from the ink reservoir 40 travels through the felt guide 34 to a felt wheel 32 that rotates therein on the highlighter accessory 30. The felt guide 34 is in continuous contact with the felt wheel 32 to transfer the ink to the felt wheel 32.

Figure 11:
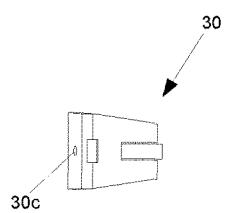
FIG. 11 shows a top view of the highlighter accessory shown in FIG. 9.
Figure 12:
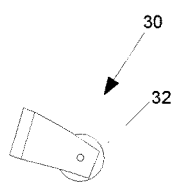
FIG. 12 shows a front view of the highlighter accessory shown in FIG. 9.

As seen in FIGS. 4 and 9-12, the highlighter accessory 30 includes a mounting portion 30b and a tapered fork 30a. The tapered fork 30a allows the highlighter 30 to fit inside the cap 18. The mounting portion 30b includes a notch 30d to allow it to be removed with a nail from the handle 12 by prying it out. The mounting portion 30b, as seen in FIG. 4, sits in a correspondingly shaped opening 10d at the curved portion 10c of the handle 12. The notch 30d extends into the correspondingly shaped opening 10d so as pry the accessory out of the handle. The felt wheel 32 includes a circular core 36 that is fixed to the fork 30a through a pin 30d allowing the felt wheel 32 to rotate. The felt guide 34 will be passing through an opening 30c, as seen in FIG. 11, and projecting past the mounting portion 30b to be in contact with the ink reservoir 40, as seen in FIG. 4.

As seen in FIGS. 5-8, it shows the glass accessory 20. The glass accessory 20 includes a mounting portion 20b and a main body 20a. The main body 20a includes a magnifier. The shape of the magnifier in this instant application is oval as seen in the end face 20c in FIG. 6, but of course, other shapes can be implemented as long as the shape allows it to be fitted inside of the cap 18 and magnify text from a document. The glass accessory 20 also features the same notch 30d as found in the highlighter accessory 30 to allow it to be pried out with a nail.

Figure 13:
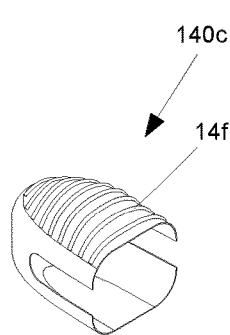
FIG. 13 shows an isometric view of a second embodiment of the rubber layer to be used with the paging device shown in FIG. 1.
Figure 14:
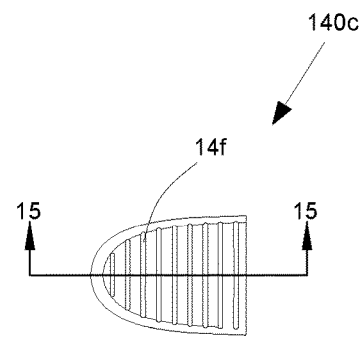
FIG. 14 shows a top view of the rubber layer shown in FIG. 13.
Figure 15:
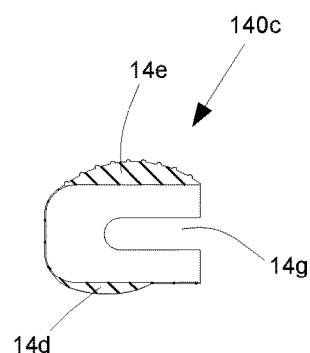
FIG. 15 shows cross-sectional view 15-15 of the rubber layer shown in FIG. 14.

While an ink reservoir 40 has been envisioned to be included as part of the kit 1, the invention can be envisioned in supplying the kit with a separate ink pad, not shown, as a supplement or a replacement to the ink reservoir 40. Furthermore, while the rubber layer 14c has been shown without a pattern, it is envisioned that the rubber layer 14c can contain a texture surface such as bumps, ridges, groove, or any other projections as similarly found in fingertips. FIGS. 13-15 show a different rubber layer 140c having similar features as rubber layer 14c. In this modified version, the rubber layer 140c contains a bump 140e and a series of spaced apart ridges 14f project from the bump 14e. This bump 14e is opposite the oval bump 14d so that it gives the user more gripping surface and prevents the rubber layer 140c from fading out to a smooth surface. Both rubber layers 14c, 140c, contains a pair of opposite slots 14g to accommodate the gels 14a, 14c. It is envisioned that the paging device can be sold with just the highlighter accessory, just the magnifier accessory, or both as herein shown in FIG. 1. It is further envisioned that while gels have been disclosed for providing comfort, other types of soft materials can be used such as EVA materials, or many types of foam materials that are resiliently flexible. These materials can be formed as pad that can be adhesively bonded to the handle 12.

It is envisioned that the highlighter felt wheel 32 can be replaced with any ordinary highlighter without having moving parts as long as the highlighter is detachable to allow the option of placing the magnifier glass 20 in the same location. It is envisioned that the ink reservoir 40 can be in any form capable of holding ink whether it is in a container or held in an absorbing material as commonly known.

The invention claimed is:

1. A paging device configured to allow a user to flip pages of a stack of papers or a book, the paging device comprising a handle and a rubber layer;
   wherein the handle comprising a leading portion, a transition portion, and a curved portion;
   wherein the leading portion being homogenously integral with the transition portion and the transition portion being homogenously integral to the curved portion;
   wherein the rubber layer entirely wrapping the leading portion and in contact with the leading portion wherein the rubber layer comprising a substantially oval bump at one end mimicking a finger; and,
   wherein the rubber layer further comprising a gripping bump opposite the substantially oval bump.

2. The device of claim 1, wherein the rubber layer comprising a gripping bump including textured projections.

3. The device of claim 1, wherein the transition portion comprising a tapered surface; and,
   wherein the tapered surface including a resiliently flexible pad.

4. The device of claim 1, where in the curved portion including at least one resiliently flexible pad.

5. The device of claim 1, wherein the curved portion terminating with an accessory.

6. The device of claim 5, wherein the accessory comprising a highlighter.

7. The device of claim 6, wherein the highlighter comprising a detachable fork including a rotatable felt wheel;
   an ink reservoir inside the curved portion; and,
   a felt guide touching the ink reservoir and the rotatable felt wheel.

8. The device of claim 5, wherein the accessory comprising a magnifying glass detachable from the curved portion.

9. The device of claim 5, further including a detachable cover housing the accessory.

10. The device of claim 1, further including a detachable highlighter and a detachable magnifying glass to be attached to the curved portion of the handle.

11. A paging device configured to allow a user to flip pages of a stack of papers or a book, the paging device comprising a handle and a rubber layer;
    wherein the handle comprising a leading portion, a transition portion, and, a curved portion;
    wherein the rubber layer wrapping the leading portion and in contact with the leading portion;
    wherein the rubber layer comprising a gripping bump;
    wherein the transition portion comprising a tapered surface including a resiliently flexible pad or gel facing in an opposite direction from the gripping bump; and,
    wherein the tapered surface narrows towards the curved portion.

12. The device of claim 11, wherein the gripping bump including textured projections.

13. The device of claim 11, wherein the curved portion terminating with an accessory.

14. The device of claim 13, wherein the accessory comprising a highlighter.

15. The device of claim 13, wherein the accessory comprising a magnifying glass detachable from the curved portion.

16. The device of claim 13, further including a detachable cover housing the accessory.

17. The device of claim 11, further including a detachable highlighter and a detachable magnifying glass to be attached to the curved portion of the handle.

18. A device comprising a handle and a rubber layer;
    wherein the handle comprising a leading portion, a transition portion, and, a curved portion;
    wherein the rubber layer wrapping the leading portion and in contact with the leading portion;
    wherein the rubber layer comprising a gripping bump;
    wherein the transition portion comprising a tapered surface including a resiliently flexible pad or gel facing in an opposite direction from the gripping bump;
    wherein the curved portion terminating with an accessory;
    wherein the accessory comprising a highlighter;
wherein the highlighter comprising a detachable fork including a rotatable felt wheel;
    an ink reservoir inside the curved portion; and,
    a felt guide touching the ink reservoir and the rotatable felt wheel.

* * * * *